(12) United States Patent
Nishigaki

(10) Patent No.: US 6,928,988 B2
(45) Date of Patent: Aug. 16, 2005

(54) CONTROL SYSTEM FOR ENGINE

(75) Inventor: Masato Nishigaki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/152,324

(22) Filed: May 20, 2002

(65) Prior Publication Data

US 2002/0189592 A1 Dec. 19, 2002

(30) Foreign Application Priority Data

May 18, 2001 (JP) ........................................ 2001-149036

(51) Int. Cl.$^7$ ............................................. F02D 17/02
(52) U.S. Cl. ....................... 123/481; 123/198 F; 60/301
(58) Field of Search ........................... 123/481, 198 F, 123/198 DB, 198 DC; 60/301

(56) References Cited

U.S. PATENT DOCUMENTS

| | | | |
|---|---|---|---|
| 3,708,980 A | * | 1/1973 | Truxell ........................ 60/274 |
| 4,104,991 A | | 8/1978 | Abdoo .................... 123/198 F |
| 4,143,635 A | | 3/1979 | Iizuka et al. ............. 123/198 F |
| 4,144,863 A | | 3/1979 | Abdoo .................... 123/198 F |
| 4,165,610 A | | 8/1979 | Iizuka et al. .................. 60/284 |
| 4,187,824 A | * | 2/1980 | Connolly ................. 123/198 F |
| 4,287,716 A | * | 9/1981 | Schuster et al. .............. 60/276 |
| 4,305,249 A | * | 12/1981 | Schmid et al. ................. 60/274 |
| 4,455,984 A | * | 6/1984 | Merlini et al. ............... 123/481 |
| 4,467,602 A | * | 8/1984 | Iizuka et al. ................... 60/276 |
| 4,653,270 A | | 3/1987 | Takii ............................ 60/302 |
| 5,050,701 A | | 9/1991 | Okui et al. .................. 180/297 |
| 5,540,633 A | * | 7/1996 | Yamanaka et al. .......... 477/107 |
| 5,555,871 A | * | 9/1996 | Gopp et al. .................. 123/481 |
| 5,562,086 A | * | 10/1996 | Asada et al. ............. 123/568.21 |
| 5,655,508 A | | 8/1997 | Nonaka ....................... 123/683 |
| 5,771,689 A | * | 6/1998 | Bareis et al. .................. 60/286 |
| 5,797,371 A | | 8/1998 | Nonaka ....................... 123/481 |
| 5,884,603 A | * | 3/1999 | Matsuki ....................... 123/333 |
| 5,956,949 A | * | 9/1999 | Mayer et al. .................. 60/301 |
| 5,979,421 A | | 11/1999 | Yamashita et al. ..... 123/568.12 |
| 6,119,453 A | | 9/2000 | Motose et al. ................ 60/285 |
| 6,125,812 A | * | 10/2000 | Garabedian ............. 123/198 F |
| 6,260,525 B1 | | 7/2001 | Moyer ...................... 123/90.16 |
| 6,276,138 B1 | * | 8/2001 | Welch .......................... 60/602 |
| 6,305,344 B1 | * | 10/2001 | Perry ...................... 123/198 F |
| 6,520,140 B2 | * | 2/2003 | Dreymuller et al. ..... 123/198 F |
| 6,568,177 B1 | * | 5/2003 | Surnilla ........................ 60/285 |
| 6,571,772 B1 | * | 6/2003 | Ott et al. ..................... 123/481 |
| 6,820,597 B1 | * | 11/2004 | Cullen et al. ............... 123/520 |

* cited by examiner

Primary Examiner—Hai Huynh
(74) Attorney, Agent, or Firm—Knobbe, Martens, Olson & Bear, LLP

(57) ABSTRACT

An electronically controlled engine management system for a multi-cylinder engine unnoticeably disables and enables various cylinder groups to preserve fuel economy. The engine management system enables the operator to enjoy high torque represented from a multi-cylinder engine and to maintain good fuel economy.

15 Claims, 6 Drawing Sheets

[FIG. 1]
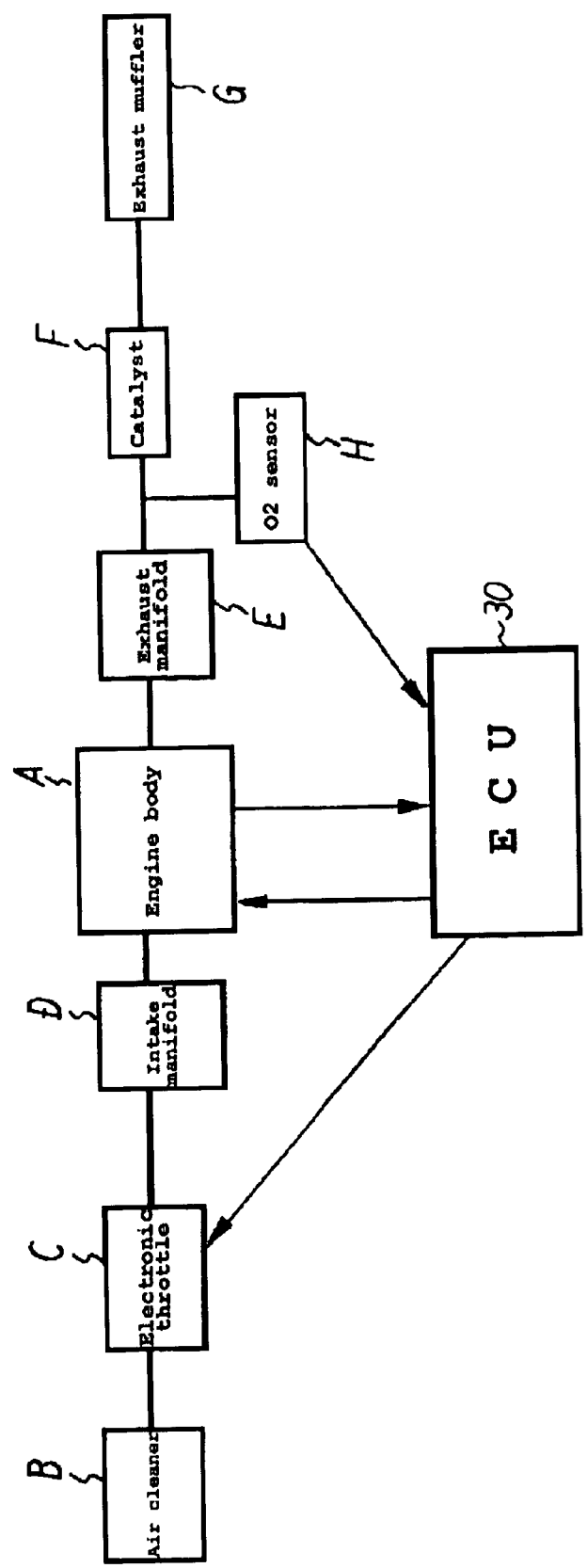

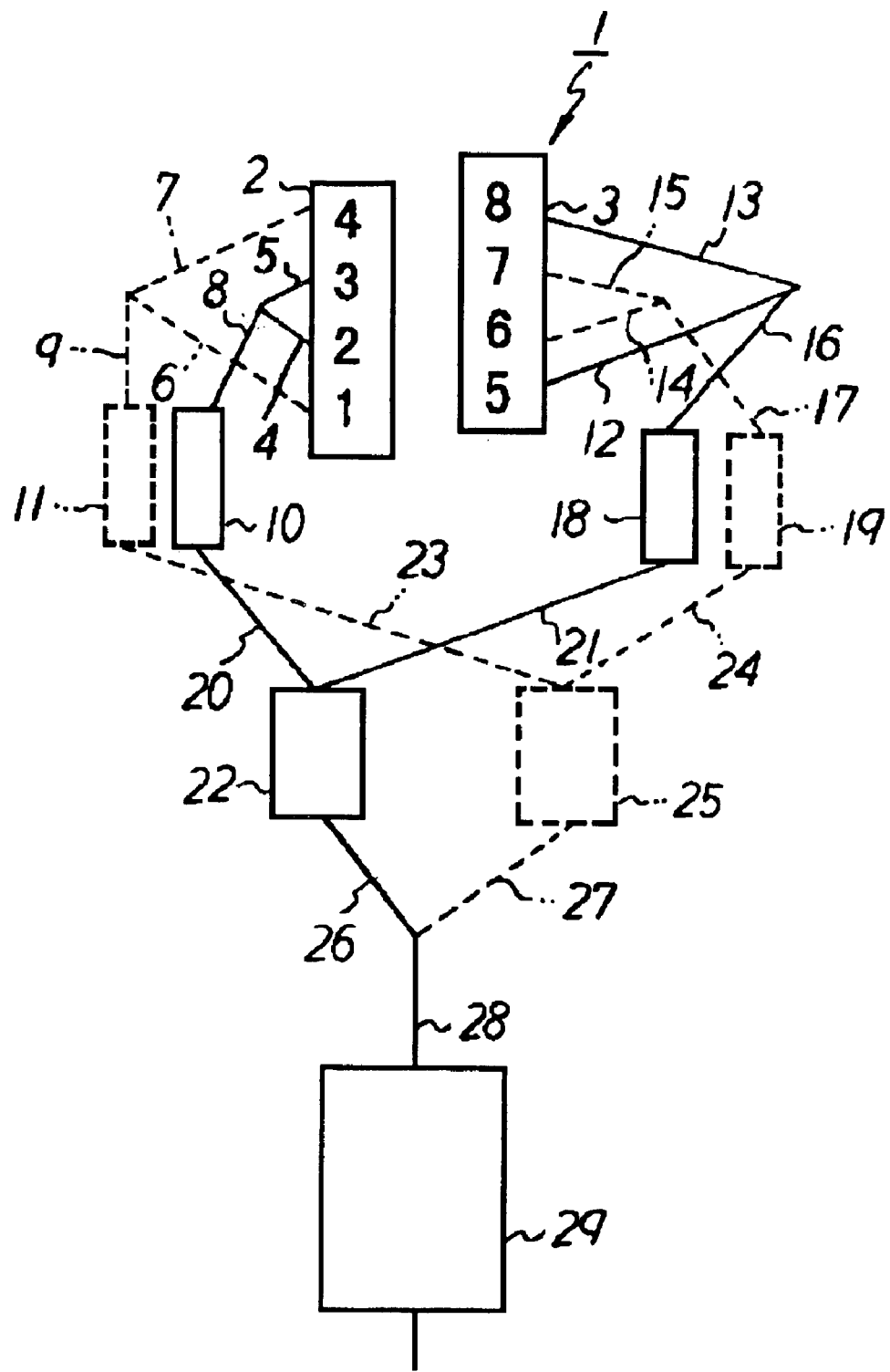
[FIG. 2]

[FIG. 3]
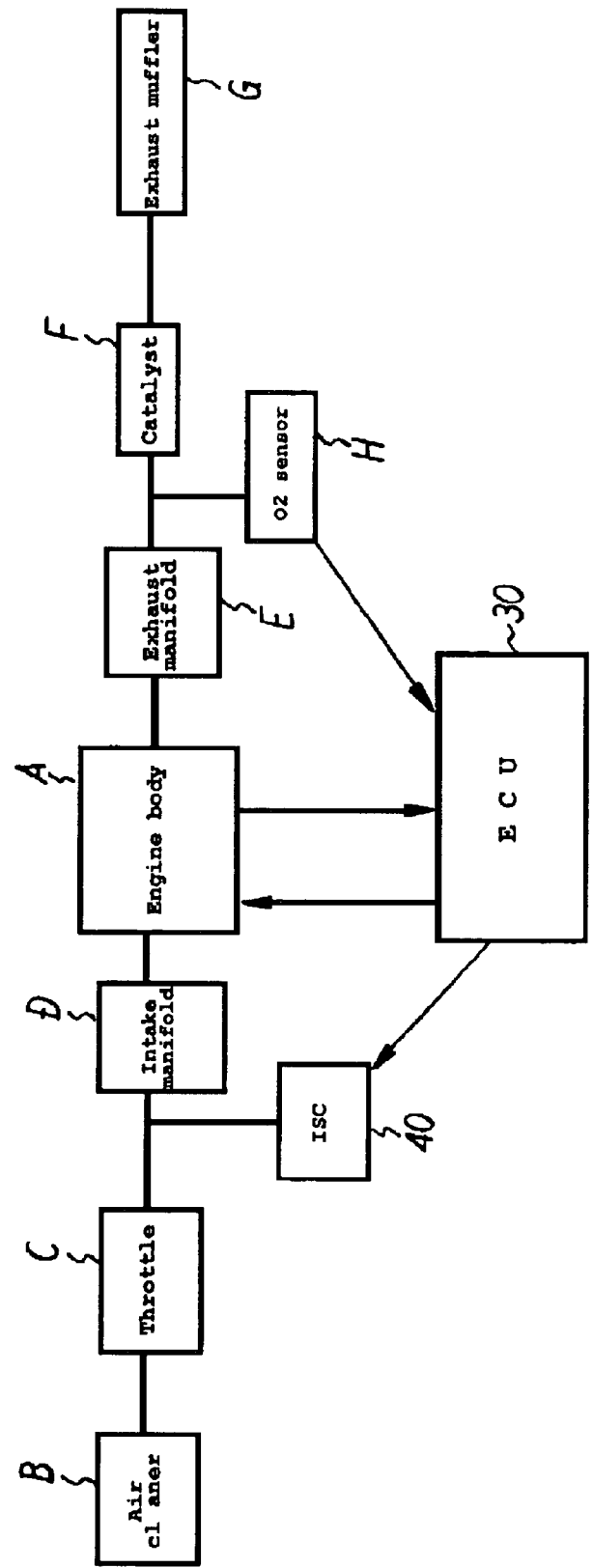

[FIG. 4]
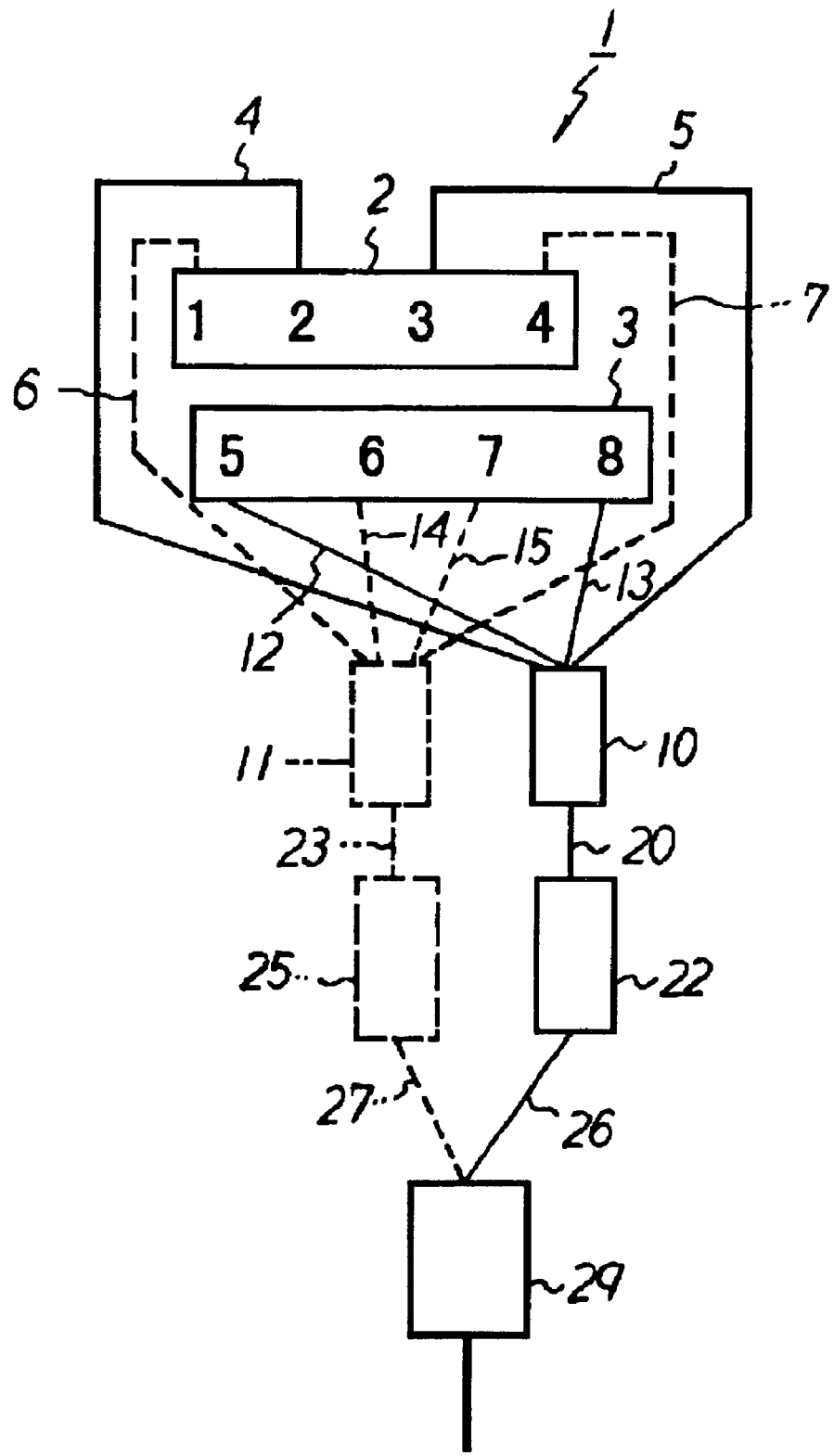

[FIG. 5]
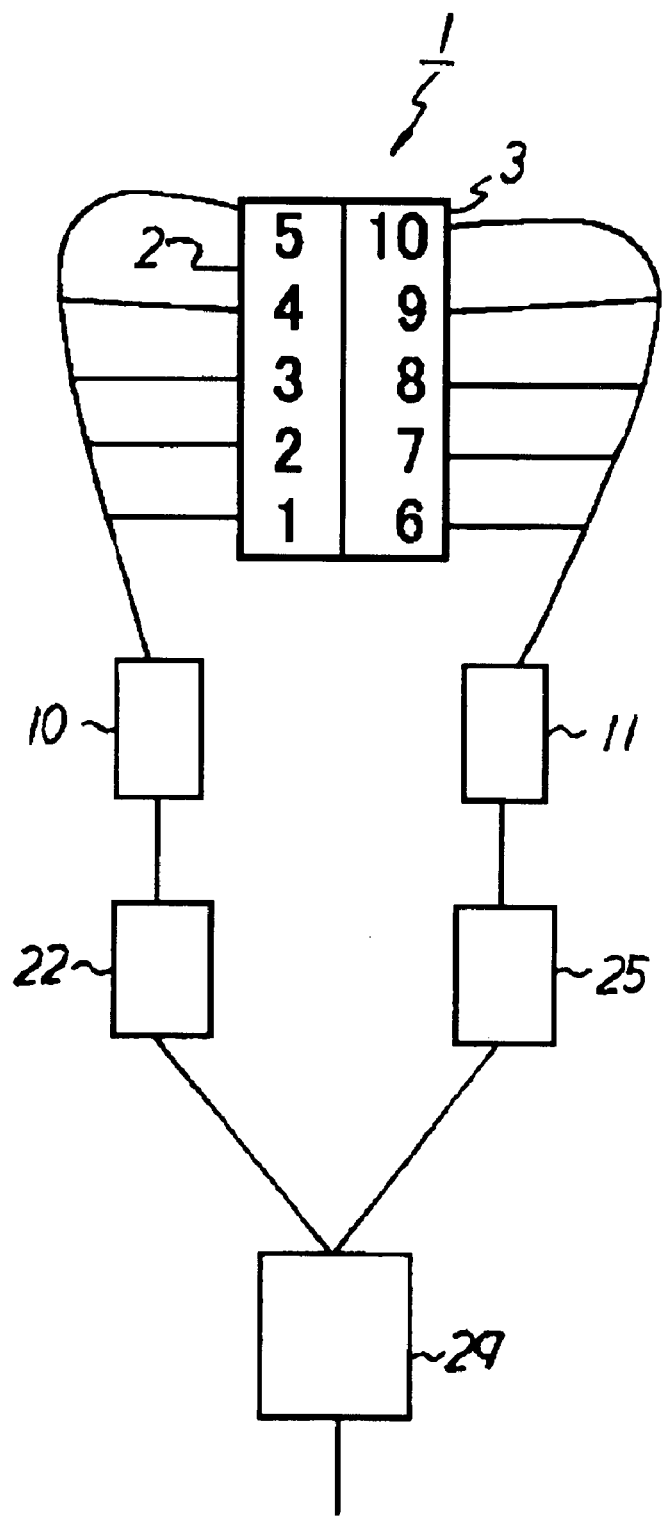

[FIG. 6]
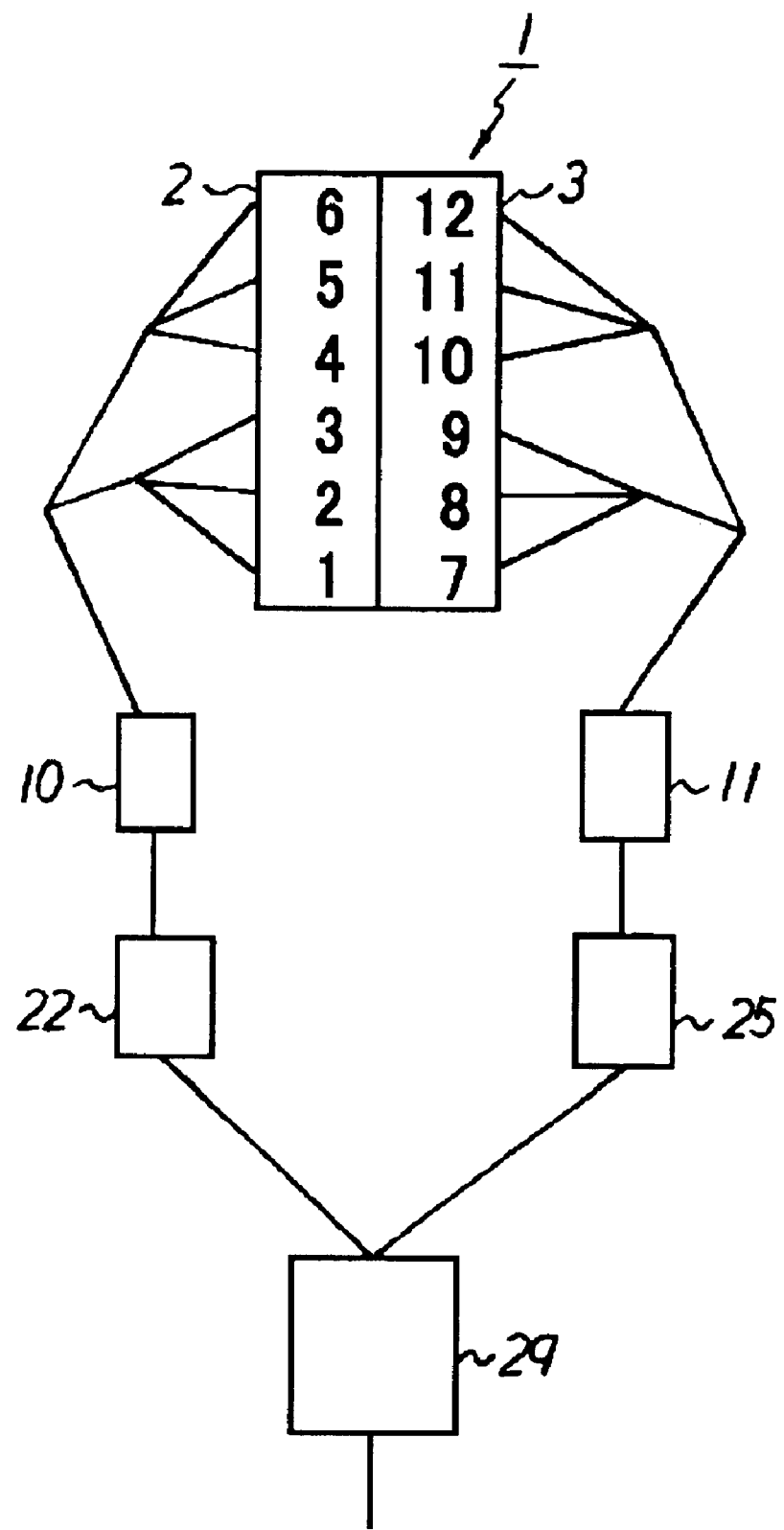

CONTROL SYSTEM FOR ENGINE

PRIORITY INFORMATION

This application is based on and claims priority to Japanese Patent Application No. 2001-149036, filed May 18, 2001 the entire contents of which is hereby expressly incorporated by reference.

BACKGROUND OF THE INVENTION

1. Field of the Invention

The present invention relates generally to an engine control system for a multi-cylinder engine, and more particularly to an improved engine control system for disabling a particular group of cylinders of the engine.

2. Brief Description of Related Art

Engines typically incorporate an engine management system. The engine management system commonly uses a computer to control a fuel injection system and an ignition system.

Smooth, quiet engine operation can in part be directly related to the number of cylinders incorporated in an engine. Operator expectations of smooth running, powerful engines have resulted in an increase in popularity of engine containing a large number of cylinders. A higher number of cylinders results in easier balancing of the various forces associated with engine operation.

Another increasing demand on engines is fuel economy. Engines that can provide operators with smooth power without sacrificing fuel efficiency are beneficial and desirable.

One way to provide operators with powerful, high-number multi-cylinder engines without sacrificing fuel economy is to disable various cylinders in the engine. Disabling various cylinders lowers the number of working cylinders to preserve fuel economy, and enabling the cylinders when a request for more torque from the operator is present preserves the high torque required. Disabling and enabling cylinders, however, can sacrifice smooth engine operability, allowing the operator to notice when the cylinders are enabled and disabled.

SUMMARY OF THE INVENTION

One aspect of the present invention is to provide a cylinder disablement strategy which preserves a drivers request for high torque and preserves high fuel economy while preserving catalytic converter efficiency. Another aspect of the present invention is to accomplish, unnoticeable to the operator, successful alternating cylinder disablement within a multi-cylinder engine.

In accordance with one or more of these aspects, an engine is provided that comprises an engine body having multiple cylinders and an engine management system. The engine management system controls the enablement and disablement of the engine cylinders. For this purpose, the engine management system includes a controller that is configured to group the cylinders into at least a first group of cylinders and a second group of cylinders. The controller operates the first group of cylinders while disabling the second group of cylinders, and subsequently disables the first group of cylinders while operating the second group of cylinders.

An additional aspect of the present invention involves an engine comprising a V-shape engine body having a pair of cylinder banks. The cylinders are divided into first and second groups of cylinders, with each group of cylinders comprising cylinders from both cylinder banks. An exhaust system routes exhaust gases from the cylinders and comprises a plurality of exhaust passages. Each exhaust passage communicates with one of the cylinders. The exhaust passages are arranged such that the exhaust passages, which communicate with at least a portion of the first group of cylinders, are routed to a first catalytic converter, and the exhaust passages, which communicate with at least a portion of the second group of cylinders, are routed to a second catalytic converter.

A further aspect of the invention involves a method of controlling groups of cylinders of a multi-cylinder engine. The method involves the steps of operating a first group of cylinders and disabling a second group of cylinders when the first group of cylinders are operating. The second group of cylinders is subsequently operated while the first group of cylinders is disabled.

BRIEF DESCRIPTION OF THE DRAWINGS

The foregoing features, aspects, and advantages of the present invention will now be described with reference to the drawings of preferred embodiments that are intended to illustrate and not to limit the invention. The drawings comprise six figures in which:

FIG. 1 is a block diagram of an engine operating system and various engine components;

FIG. 2 is another block diagram of an engine operating system and various engine components;

FIG. 3 is a schematic diagram of an exhaust system of an eight cylinder engine in accordance with a preferred embodiment of the present invention, with various parts of the engine exhaust system shown in phantom;

FIG. 4 is another block diagram of an exhaust system of an eight cylinder engine in accordance with another preferred embodiment of the present invention, with various parts of the engine exhaust system shown in phantom;

FIG. 5 is schematic diagram of an exhaust system of an ten cylinder engine in accordance with a further preferred embodiment of the present invention, with various parts of the engine exhaust system shown in phantom;

FIG. 6 is schematic diagram of an exhaust system of an twelve cylinder engine in accordance with another preferred embodiment of the present invention.

DETAILED DESCRIPTION OF THE PREFERRED EMBODIMENTS OF THE INVENTION

The Overall Construction

The present engine, including its management system and exhaust system, will be explained in the context of several embodiments. Where appropriate, like reference numerals have been used in the following description of and in the figures of the embodiments to indicate similar components among the embodiments. Each embodiment involves a high-number of cylinders (e.g., 8 cylinders or greater) because various aspects and features of the present engine have particular applicability in large, multi-cylinder engines; however, certain aspects and features of the present engine can also be used with smaller engines (e.g., 4 cylinders) as well, as one skilled in the art will appreciate.

The engines in the illustrated embodiments preferably operate on a four-cycle combustion principle. An engine body 10 of each embodiment preferably includes a double-overhead-cam (DOHC) system and a V-shaped cylinder block. The number of cylinders varies among the embodiments between eight, ten and twelve cylinders. The cylinder block thus defines two cylinder banks, which extend generally side-by-side with each other. The cylinder bores of each bank extend generally vertically (i.e., extend upwardly at an incline relative to a vertical plane passing through a rotational axis of the engine) and are generally horizontally spaced from one another. This type of engine, however, merely exemplifies one type of engine. Engines having other numbers of cylinders, having other cylinder arrangements (in-line, opposing, etc.), and operating on other combustion principles (e.g., crankcase compression, two-stroke or rotary) can be used in other embodiments.

A movable member, such as a reciprocating piston, moves relative to the cylinder block in a suitable manner. Pistons reciprocate within each cylinder bore. Because the cylinder block is split into the two cylinder banks, each cylinder bank extends outward at an angle to an independent first end in the V-shape arrangement. A pair of cylinder head members is fixed to the respective first ends of the cylinder banks to close those ends of the cylinder bores. The cylinder head members together with the associated pistons and cylinder bores provide combustion chambers. Of course, the number of combustion chambers can vary, as indicated above. Each of the cylinder head members preferably is covered with the cylinder head cover member.

A crankcase member is coupled with the cylinder block and a crankcase cover member is further coupled with a crankcase member. The crankcase member and a crankcase cover member close the other end of the cylinder bores and, together with the cylinder block, define the crankcase chamber. A crankshaft extends generally vertically through the crankcase chamber and journaled for rotation about a rotational axis by several bearing blocks. Connecting rods couple the crankshaft with the respective pistons in any suitable manner. Thus, a reciprocal movement of the pistons rotates the crankshaft.

Preferably, the major engine portions are made of aluminum alloy. In some arrangements, the cylinder head cover members can be unitarily formed with the respective cylinder members. Also, the crankcase cover member can be unitarily formed with the crankcase member. The engine body 10 thus, in the illustrated embodiments, is defined at least by the engine block, pistons, cylinder heads, cylinder head covers, DOHC system, crankcase member, crankshaft, connecting rods, and the crankcase cover.

With reference to FIGS. 1 and 2, various engine components and control sequence arrows can be seen. The diagrams illustrates a simplistic block format to show engine component functionality and to illustrate the control sequences.

The engine comprises an air intake system. The air intake system draws air from the atmosphere through an air filter 12 to the combustion chambers of the engine. The air intake systems shown preferably comprises eight, ten, or twelve intake passages within a pair of intake manifolds 14 containing plenum chambers. Each cylinder bank communicates with the corresponding intake passages and intake manifold 14.

In the present embodiment, the most downstream portions of the intake passages are defined within the cylinder head member as inner intake passages. The inner intake passages communicate with the combustion chambers through intake ports, which are formed at inner surfaces of the cylinder head members. Typically, each of the combustion chambers has one or more intake ports. Intake valves are slidably disposed at each cylinder head member to move between an open position and a closed position. As such, the valves act to open and close the ports to control the flow of air into the combustion chamber. Biasing members, such as springs, are used to urge the intake valves toward their respective closed positions by acting between a mounting boss formed on each cylinder head member and a corresponding retainer that is affixed to each of the valves. When each intake valve is in the open position, the inner intake passage associated with the intake port(s) communicates with the associated combustion chamber.

The intake manifold containing the inner intake passages communicates with at least one throttle body, in which a throttle valve assembly is positioned. The throttle bodies are connected to the inner intake passages. One or more intake runners are disposed upstream of the throttle body and connect the inner intake passages with the respective throttle bodies.

Each throttle valve assembly preferably includes a throttle valve 16 (FIG. 2). Preferably, the throttle valves are butterfly valves that have valve shafts journaled for pivotal movement. In some arrangements (FIG. 1), the throttle valve may be an electronic throttle 18 (e.g., EGAS) in which case the throttle valve shaft is activated directly by an electric motor controlled by an ECU (Electronic Control Unit) 20. The throttle valve assembly regulates the amount of air that flow through intake passages to the combustion chambers in response to operator request. Normally, the greater the opening degree of the valve, the higher the rate of airflow and the higher the engine speed.

In some arrangements involving a mechanically actuated throttle valve, the air intake system may also incorporate a high volume AAV (auxiliary air valve) 22 to help adjust the engine speed by regulating an amount of air allowed to bypass the throttle valve assembly. Additionally, various aspects and features of the present engine can also be used with throttle-less engine technology in which the intake valves are used to regulate the amount of air flow into the respective cylinder. Such systems involve electronic, pneumatic or hydraulic actuation of the valves in order to vary the timing and duration of intake valve opening.

The engine further includes an exhaust system that routes burnt charges, i.e., exhaust gases, to the atmosphere. Each cylinder head member defines a set of inner exhaust passages that communicate with each corresponding combustion chamber through one or more exhaust ports, which preferably are defined at the inner surfaces of the respective cylinder head members. The exhaust ports can be selectively opened and closed by exhaust valves. The construction of each exhaust valve and the arrangement of the exhaust valves are substantially the same as the intake valve and the arrangement thereof, respectively. The exhaust gases travel through the inner exhaust passages and into an exhaust manifold 24. An oxygen sensor 26 measures the amount of oxygen in the exhaust gas and relays the information to the ECU 20 to adjust for a proper mixture ratio. The exhaust gases travel further through a catalyst 28 where toxic gases are converted into oxygen, water and less toxic byproducts. After the catalyst 28, the exhaust gases are routed through a muffler 30 and into the atmosphere. A more detailed description of the exhaust system manifolds 24 and routing design will be explained later in a detailed description of several of the preferred embodiments.

A valve cam mechanism preferably is provided for actuating the intake and exhaust valves in each cylinder bank. In the embodiment shown, the valve cam mechanism includes a plurality of rotatable members, such as a pair of camshafts per cylinder bank. The camshafts typically comprise intake and exhaust camshafts that extend generally horizontal and are journaled for rotation on the cylinder head members and are covered by the cylinder head cover members. In the illustrated embodiment, the camshafts have cam lobes to push valve lifters that are fixed to the respective ends of the intake and exhaust valves in any suitable manner; the cam lobes repeatedly push the valve lifters in a timely manner, which is in proportion to the engine speed. The movement of the lifters generally is timed by rotation of the camshaft to appropriately actuate the intake and exhaust valves. Other types of valve actuation mechanisms, however, can be used with the present engine. For example, camless valve actuation technology, which involves either electronic, pneumatic or hydraulic actuation, can alternatively be used with the present engine.

The illustrated engines further include direct fuel injection. The fuel injection systems include at least one fuel injector allotted to each one of the respective combustion chambers. The fuel injectors preferably are mounted on the cylinder heads of the respective banks. Fuel is supplied to the fuel injection system from one or more fuel tanks (not shown).

In the illustrated embodiment, each fuel injector has an injection nozzle directed within the associated combustion chamber. The fuel injectors spray fuel directly into the combustion chambers under control of the ECU 20. The ECU 20 controls the initiation, timing and the duration of the fuel injection cycle of the fuel injectors so that the nozzles spray a desired amount of fuel for each combustion cycle.

The engines further include an ignition system. Each combustion chamber is provided with at least one igniter. In the illustrated embodiment, at least one spark plug, which functions as the igniter, is disposed between the intake and exhaust valves. Each spark plug has electrodes that are exposed in the associated combustion chamber. The electrodes are spaced apart from each other by a small gap. The spark plugs are connected to the ECU 20 through ignition coils. Individual ignition coils can control each spark plug or each ignition coil can control numerous spark plugs. The spark plugs generate a spark between the electrodes to ignite an air/fuel charge in the combustion chamber according to desired ignition timing maps or other forms of controls.

Generally, during an intake stroke, air is drawn into the combustion chambers through the air intake passages and fuel is mixed with the air by the fuel injectors. The mixture is then compressed during the compression stroke. Just prior to a power stroke, the respective spark plugs ignite the compressed air/fuel charge in the respective combustion chambers. The air/fuel charge thus rapidly burns during the power stroke to move the pistons. The burnt charge, i.e., exhaust gases, then is discharged from the combustion chambers during an exhaust stroke.

The illustrated engines further comprise a lubrication system to lubricate the moving parts within the engine. The lubrication system preferably is a pressure fed system where the pressure is sufficient to adequately lubricate the bearings and other rotating surfaces. The lubrication system may comprise either a wet sump or a dry sump system, and oil may be taken from an oil reservoir and delivered under pressure throughout the engine to lubricate the internal moving parts.

The engine 10 may include other systems, mechanisms, devices, accessories, and components other than those described above such as, for example, a cooling system. The crankshaft through a flexible transmitter, such as a timing belt or chain can directly or indirectly drive those systems, mechanisms, devices, accessories, and components.

The Engine Control System

In a preferred embodiment of the present engine the engine cylinders are separated into two groups of cylinders. Each group preferably comprise one half of the total number of cylinders; however, the cylinders may be divided into a larger number of groups. At a particular time, all cylinders within a group are disabled for a predetermined amount of time. Each group is comprised of specific cylinders to maintain a balances engine operation during cylinder disablement.

The corresponding cylinder group exhaust passages are routed to maintain the efficiency of the catalytic converters during disablement. The efficiency of the catalytic converters depends on temperature as well as a correct exhaust gas content depending on the correct air fuel mixture.

Direct fuel injection inhibits residual fuel, which is commonly found on the intake valves with port or indirect fuel injection, from entering the catalyst during cylinder disablement. This residual fuel is uncontrolled and can act as a source of excess hydrocarbons for which the ECU cannot account. With the direct fuel injection system, the ECU can precisely control the amount of fuel injected. If the ECU determines that the catalyst, which correspondence to a disabled group of cylinders, may cool too much during the disablement period, the ECU can operate the direct fuel injection system to delivery a precisely controlled amount of fuel that is sufficient to heat the catalyst and maintain it at a desired temperature. Preferably, the injection of fuel into the disabled cylinder is done during an exhaust stroke.

Each cylinder within a group communicates with a common set of catalytic converters assigned to that particular group. During cylinder disablement the disabled group of cylinders is switched with the enabled group of cylinders after a predetermined amount of time. This periodic exchange of cylinder groups between enabling and disabling provides a consistent engine temperature throughout the engine body. Maintaining consistent engine temperatures throughout the engine body accounts for correct expansion of engine components, providing reliability and long engine life. Switching the enabled group of cylinders with the disabled group of cylinders also maintains an efficient catalytic converter temperature. A detailed description of the exhaust routing to maintain efficient catalytic converter temperatures will be described below with reference to FIG. 3.

Exhaust manifolds communicate with the combustion chambers through the inner exhaust passages and the exhaust ports to collect the exhaust gas therefrom. When the exhaust ports are opened, the combustion chambers communicate with the exhaust discharge passage through the exhaust manifolds.

With reference to FIG. 3, a block diagram showing an exhaust system of a V-8 cylinder engine 34, which is shown longitudinally, can be seen. The eight cylinders within the engine are numbered 1 through 8 respectively. The engine 34 is separated into two cylinder banks 36 and 38. Each cylinder bank corresponds to a number of cylinders within each respective cylinder bank, for example, cylinder bank 36 defines cylinders 1 through 4 and cylinder bank 38 defines cylinders 5 through 8. The firing sequence or order in which the cylinders are ignited preferably is 1-3-7-2-6-5-4-8.

The engine 34 is further separated into two specific cylinder groups. A first group comprises the cylinders 1, 7, 6, and 4, and a second group comprises the cylinders 3, 2, 5, and 8. Therefore, the ignition firing sequence alternates spark plug initiation within a group of cylinders between the two cylinder banks preserving proper engine balance. During a disablement of a particular group, the cylinders in the other group are so arranged within the engine and the alternating ignition firing sequence is so designed that engine balance is preserved.

The 1 and 4 cylinders of the first group in bank 36 communicate with a pair of exhaust manifold passages 40, 42, respectively, and guide the exhaust gases to a primary catalytic converter 44 through a common exhaust pipe 46. After the primary catalytic converter 44, the exhaust gases proceed to a main catalytic converter 48 through an exhaust pipe 50. The 7 and 6 cylinders of the first group in bank 34 communicate with a pair of exhaust manifold passages 52, 54, respectfully, and guide the exhaust gases to another primary catalytic converter 56 through a common exhaust pipe 58. After the primary catalytic converters 56, the exhaust gases proceed to the main catalytic converter 48 through an exhaust pipe 60.

The 3 and 2 cylinders of the second group in bank 36 communicate with another pair of exhaust manifold passages 66, 68, respectively, and guide the exhaust gases to a primary catalytic converter 70 through a common exhaust pipe 72. After the primary catalytic converter 70, the exhaust gases proceed to a main catalytic converter 74 through an exhaust pipe 76. The 5 and 8 cylinders of the second group in bank 34 communicate with an additional pair of exhaust manifold passages 78, 80, respectfully, and guide the exhaust gases to another primary catalytic converter 82 through a common exhaust pipe 84. After the primary catalytic converters 82, the exhaust gases proceed to the main catalytic converter 74 through an exhaust pipe 86.

The exhaust gases from the main catalytic converter 48 of 1, 7, 6, and 4 cylinders travel through an exhaust pipe 90 and merge with an exhaust pipe 92 from the main catalytic converter 74 of the 3, 2, 5, and 8 cylinders. The merged exhaust gases enter into the common muffler 30 through a common exhaust pipe 94 and exit to the atmosphere.

FIG. 4 illustrates another block diagram showing an exhaust system of a V-8 cylinder engine 100 shown in a transverse mounting arrangement. The eight cylinders within the engine are numbered 1 through 8 respectively. The engine 100 is separated into two cylinder banks 36 and 38. Each cylinder bank corresponds to a number of cylinders within each respective cylinder bank, for example, cylinder bank 36 defines cylinders 1 through 4 and cylinder bank 38 defines cylinders 5 through 8. The firing sequence or order in which the cylinders are ignited remains 1-3-7-2-6-5-4-8 as in the previous embodiment.

The engine 34 is also separated into two specific cylinder groups. A first group comprises the cylinders 1, 7, 6, and 4, and a second group comprises the cylinders 3, 2, 5, and 8. Again, the ignition firing sequence alternates spark plug initiation within a group of cylinders between the two cylinder banks preserving proper engine balance. During a disablement of a particular group, the cylinders in the other group are so arranged within the engine and the alternating ignition firing sequence is so designed that engine balance is again preserved.

The 1 and 4 cylinders of the first group in bank 36 communicate with the a pair of exhaust manifold passages 40, 42, respectively, and guide the exhaust gases to a primary catalytic converter 102. The 7 and 6 cylinders of the first group in bank 34 communicate with the a second pair of exhaust manifold passages, 52, 54, respectfully, and guide the exhaust gases to the same primary catalytic converter 102. After the primary catalytic converter 102, the exhaust gases proceed to a main catalytic converter 104 through an exhaust pipe 106.

The 3 and 2 cylinders of the second group in bank 36 communicate with a third pair of exhaust the manifold passages 66, 68, respectively, and guide the exhaust gases to a primary catalytic converter 108. The 5 and 8 cylinders of the second group in bank 34 communicate with a fourth pair of exhaust manifold passages, 78, 80, respectfully, and guide the exhaust gases to the same primary catalytic converter 108. After the primary catalytic converter 108, the exhaust gases proceed to a main catalytic converter 110 through an exhaust pipe 112.

The exhaust gases from the main catalytic converter 104 of cylinders 1, 7, 6, and 4 travel through an exhaust pipe 90 and merge with an exhaust pipe 92 from the main catalytic converter 110 of cylinders 3, 2, 5, and 8. The merged exhaust gases enter into the common muffler 30 through the common exhaust pipe 94 and exit to the atmosphere.

With reference to FIG. 5, a block diagram illustrating an exhaust system of a V-10 cylinder engine 120 is shown. The ten cylinders within the engine are numbered 1 through 10 respectively. The engine 120 is separated into two cylinder banks 122 and 124. Each cylinder bank corresponds to a number of cylinders within each respective cylinder bank, for example, cylinder bank 122 defines cylinders 1 through 5and cylinder bank 124 defines cylinders 6 through 10. The firing sequence or order in which the cylinders are ignited is 1-10-5-7-2-8-3-9-4-6.

The engine 120 is further separated into two specific cylinder groups. A first group comprises the cylinders 1–5 and a second group comprises the cylinders 6–10. The ignition firing sequence alternates spark plug initiation within a group of cylinders in one cylinder bank. During a disablement of a particular group, the cylinders in each group are arranged and act as an inline five-cylinder engine format and the alternating ignition firing sequence so designed that engine balance is preserved.

The exhaust gases from the first group comprising cylinders 1–5 are collected and routed to a first group primary catalytic converter 126. After the first group primary catalytic converter 126, the exhaust gases proceed to a first group main catalytic converter 128.

The exhaust gases from the second group comprising cylinders 6–10 are collected and routed to a second group primary catalytic converter 130. After the second group primary catalytic converter 130, the exhaust gases proceed to a second group main catalytic converter 132.

The exhaust gases from the first bank primary catalytic converter 126 of cylinders 1–5 proceed to the first bank main catalytic converter 128. The exhaust gases from the second bank primary catalytic converter 130 of cylinders 6–10 proceed to the second bank main catalytic converter 132. The exhaust gases from both main catalytic converters merge and enter the common muffler 30 and exit to the atmosphere.

With reference to FIG. 6, a block diagram illustrating an exhaust system of a V-12 cylinder engine 140 is shown. The twelve cylinders within the engine are numbered 1 through 12 respectively. The engine 140 is separated into two cylinder banks 142 and 144. Each cylinder bank corresponds to a number of cylinders within each respective cylinder bank, for example, cylinder bank 142 defines cylinders 1 through 6 and cylinder bank 144 defines cylinders 7 through 12. The firing sequence or order in which the cylinders are ignited is 1-7-5-11-3-9-6-12-2-8-4-10.

The engine 140 is further separated into two specific cylinder groups. A first group comprises the cylinders 1–6 and a second group comprises the cylinders 7–12. The ignition firing sequence alternates spark plug initiation within a group of cylinders in one cylinder bank. During a disablement of a particular group, the cylinders in each group are arranged and act as an inline six-cylinder engine format and the alternating ignition firing sequence so designed that engine balance is preserved.

The exhaust gases from the first group comprising cylinders 1–6 are collected and routed to a first group primary catalytic converter 146. After the first group primary catalytic converter 146, the exhaust gases proceed to a first group main catalytic converter 148.

The exhaust gases from the second group comprising cylinders 7–12 are collected and routed to a second group primary catalytic converter 150. After the second group primary catalytic converter 150, the exhaust gases proceed to a second group main catalytic converter 152.

The exhaust gases from the first bank primary catalytic converter 146 of cylinders 1–6 proceed to the first bank main catalytic converter 148. The exhaust gases from the second bank primary catalytic converter 150 of cylinders 7–12 proceed to the second bank main catalytic converter 152. The exhaust gases from both main catalytic converters merge and enter the common muffler 30 and exit to the atmosphere.

Such a constant, carefully controlled switching of cylinder disablement groups provides for consistently efficient exhaust catalyst temperatures and overall consistent engine body temperature.

Prior to alternating the disablement of the particular cylinder groups in all of different engine layouts, both groups of cylinders preferably are enabled for a predetermined amount of time to provide a smooth disablement transition. Through the use of the electronic throttle 18 or the high volume AAV 22, engine speed may be accurately adjusted during cylinder disablement switching periods to provide an unnoticeable transition to the operator.

Disablement of cylinders, in all of the embodiments, can be accomplished by either ceasing fuel injection and/or ceasing ignition. Preferably, the engine management system does both when disabling one of the groups of cylinders. This allows the ECU the option of injecting a relatively small amount of fuel into one or more of the disabled cylinders in order to maintain the corresponding catalyst(s) at a desired temperature, as discussed above.

It is to be noted that the control system described above may be in the form of a hard-wired feedback control circuit in some configurations. Alternatively, the control system may be constructed of a dedicated processor and memory for storing a computer program configured to perform the steps described above in the context of the flowchart. Additionally, the control systems may be constructed of a general-purpose computer having a general-purpose processor and memory for storing the computer program for performing the routine. Preferably, however, the control system is incorporated into the ECU 88, in any of the above-mentioned forms.

Although the present invention has been described in terms of a certain preferred embodiments, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. An engine comprising an engine body having multiple cylinders, an engine management system at least controlling enablement of the cylinders, the engine management system including a controller configured to group the cylinders into at least a first group of cylinders and a second group of cylinders and to operate the first group of cylinders while disabling the second group of cylinders, the controller further configured to subsequently disable the first group of cylinders and operate the second group of cylinders, and an exhaust system having a plurality of exhaust passages, each exhaust passage communicating with one of the cylinders, the exhaust passages communicating with the first group of cylinders merging together, and the exhaust passages communicating with the second group of cylinders merging together, and at least one catalyst being disposed downstream of where the corresponding exhaust passages merge together, wherein the first group of cylinders comprises cylinders disposed in both banks of cylinders, and the second group of cylinders comprises cylinders disposed in both banks of cylinders.

2. An engine as in claim 1, wherein the controller is further configured to alternate operation of said first group of cylinders with operation of said second group of cylinders, the second group of cylinders being disabled when the first group of cylinders is in operation and the first group of cylinders being disabled when the second group of cylinders is in operation.

3. An engine as in claim 2, wherein the controller is additionally configured to operate simultaneously the first and second groups of cylinders between alternately disabling the first and second groups of cylinders.

4. An engine as in claim 1, wherein the controller is configured to operate simultaneously the first and second groups of cylinders after the controller has ceased disabling either the first or second group of cylinders.

5. An engine as in claim 1 additionally comprising a fuel injection system including a plurality of fuel injectors, each fuel injector arranged so as to supply a fuel charge to at least one of the cylinders, the controller being further configured to control the fuel injectors so as to cease operation of those fuel injectors corresponding to the first group of cylinders when the controller disables the first group of cylinders and to cease operation of those fuel injectors corresponding to the second group of cylinders when the controller disables the second group of cylinders.

6. An engine as in claim 5, wherein each of the fuel injectors is arranged to inject fuel directly into the corresponding cylinder.

7. An engine as in claim 6 additionally comprising an ignition system including a plurality of igniters, at least one of the igniters being disposed so as to ignite at least a portion of an air-fuel charge in each cylinder, and the controller being further configured to control the igniters so as to cease operation of those igniters corresponding to the first group of cylinders when the controller disables the first group of cylinders and to cease operation of those igniters corresponding to the second group of cylinders when the controller disables the second group of cylinders.

8. An engine as in claim 7, wherein the controller is configured to inject an amount of fuel into at least one the disabled cylinders that communicates with a catalyst.

9. An engine as in claim 1 additionally comprising an ignition system including a plurality of igniters, at least one of the igniters being disposed so as to ignite at least a portion of an air-fuel charge in each cylinder, and the controller being further configured to control the igniters so as to cease operation of those igniters corresponding to the first group of cylinders when the controller disables the first group of cylinders and to cease operation of those igniters corresponding to the second group of cylinders when the controller disables the second group of cylinders.

10. An engine as in claim 9, wherein at least some of the valves are electronic throttle valves.

11. An engine as in claim 9, wherein at least some of the valves are auxiliary air valves.

12. An engine as in claim 1 additionally comprising an induction system including at least two valves, at least one of the valves corresponding to at least one cylinder of the first group of cylinders and at least another of the valves corresponding to at least one of the cylinders of the second group of cylinders, the valves being electronically controlled by the controller, and the controller being configured to close the valve corresponding to at least one of the cylinders of the first group of cylinders when the controller disables the first group of cylinders, and to close the valve corresponding to at least one of the cylinders of the second group of cylinders when the controller disables the second group of cylinders.

13. An engine as in claim 1, wherein the engine body has a V-shape construction formed by two banks of cylinders.

14. An engine comprising a V-shape engine body having a pair of cylinder banks, the cylinders being divided into first and second groups of cylinders with each group of cylinders comprising cylinders from both cylinder banks, an engine management system configured to alternately disable the first and second groups of cylinders, and an exhaust system comprising a plurality of exhaust passages, each exhaust passage communicating with one of the cylinders, the exhaust passages that communicate with at least a portion of the first group of cylinders being routed to a first catalytic converter, and the exhaust passages that communicate with at least a portion of the second group of cylinders being routed to a second catalytic converter, the first catalytic converter and the second catalytic converter not communicating with each other.

15. An exhaust system as in claim 14, wherein all of the exhaust passages that communicate with cylinders of the first group of cylinders merging together, and all of the exhaust passages that communicate with cylinders of the second group of passages merge together.

* * * * *

UNITED STATES PATENT AND TRADEMARK OFFICE
CERTIFICATE OF CORRECTION

PATENT NO.         : 6,928,988 B2
APPLICATION NO.  : 10/152324
DATED              : August 16, 2005
INVENTOR(S)       : Masato Nishigaki It is certified that error appears in the above-identified patent and that said Letters Patent is hereby corrected as shown below:

The title page showing the illustrative figure should be deleted to be replaced with the attached title page.

In Column 2, Line 45, after "system of", please delete "an" and insert --a--, therefor.

In Column 3, Line 52, please delete "illustrates" and insert --illustrate--, therefor.

In Column 7, Line 66, after "with", please delete "the".

In Column 8, Line 2, after "with", please delete "the".

Signed and Sealed this

Twenty Second Day of April, 2008

JON W. DUDAS
*Director of the United States Patent and Trademark Office*

United States Patent
Nishigaki

(10) Patent No.: US 6,928,988 B2
(45) Date of Patent: Aug. 16, 2005

(54) CONTROL SYSTEM FOR ENGINE

(75) Inventor: Masato Nishigaki, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 10/152,324

(22) Filed: May 20, 2002

(65) Prior Publication Data
US 2002/0189592 A1 Dec. 19, 2002

(30) Foreign Application Priority Data
May 18, 2001 (JP) .................... 2001-149036

(51) Int. Cl.⁷ .................................. F02D 17/02
(52) U.S. Cl. .................. 123/481; 123/198 F; 60/301
(58) Field of Search ................... 123/481, 198 F, 123/198 DB, 198 DC; 60/301

(56) References Cited

U.S. PATENT DOCUMENTS

| | | | |
|---|---|---|---|
| 3,708,980 A * | 1/1973 | Truxell | 60/274 |
| 4,104,991 A | 8/1978 | Abdoo | 123/198 F |
| 4,143,635 A | 3/1979 | Iizuka et al. | 123/198 F |
| 4,144,863 A | 3/1979 | Abdoo | 123/198 F |
| 4,165,610 A | 8/1979 | Iizuka et al. | 60/284 |
| 4,187,824 A * | 2/1980 | Connolly | 123/198 F |
| 4,287,716 A * | 9/1981 | Schuster et al. | 60/276 |
| 4,305,249 A * | 12/1981 | Schmid et al. | 60/274 |
| 4,455,984 A * | 6/1984 | Merlini et al. | 123/481 |
| 4,467,602 A * | 8/1984 | Iizuka et al. | 60/276 |
| 4,653,270 A | 3/1987 | Takii | 60/302 |
| 5,050,701 A | 9/1991 | Okui et al. | 180/297 |
| 5,540,633 A * | 7/1996 | Yamanaka et al. | 477/107 |
| 5,555,871 A * | 9/1996 | Gopp et al. | 123/481 |
| 5,562,086 A * | 10/1996 | Asada et al. | 123/568.21 |
| 5,655,508 A | 8/1997 | Nonaka | 123/683 |
| 5,771,689 A * | 6/1998 | Bareis et al. | 60/286 |
| 5,797,371 A | 8/1998 | Nonaka | 123/481 |
| 5,884,603 A * | 3/1999 | Matsuki | 123/333 |
| 5,956,949 A * | 9/1999 | Mayer et al. | 60/301 |
| 5,979,421 A | 11/1999 | Yamashita et al. | 123/568.12 |
| 6,119,453 A | 9/2000 | Motose et al. | 60/285 |
| 6,125,812 A * | 10/2000 | Garabedian | 123/198 F |
| 6,260,525 B1 | 7/2001 | Moyer | 123/90.16 |
| 6,276,138 B1 * | 8/2001 | Welch | 60/602 |
| 6,305,344 B1 * | 10/2001 | Perry | 123/198 F |
| 6,520,140 B2 * | 2/2003 | Dreymuller et al. | 123/198 F |
| 6,568,177 B1 * | 5/2003 | Surnilla | 60/285 |
| 6,571,772 B1 * | 6/2003 | Ott et al. | 123/481 |
| 6,820,597 B1 * | 11/2004 | Cullen et al. | 123/520 |

* cited by examiner

*Primary Examiner*—Hai Huynh
(74) *Attorney, Agent, or Firm*—Knobbe, Martens, Olson & Bear, LLP

(57) ABSTRACT

An electronically controlled engine management system for a multi-cylinder engine unnoticeably disables and enables various cylinder groups to preserve fuel economy. The engine management system enables the operator to enjoy high torque represented from a multi-cylinder engine and to maintain good fuel economy.

15 Claims, 6 Drawing Sheets

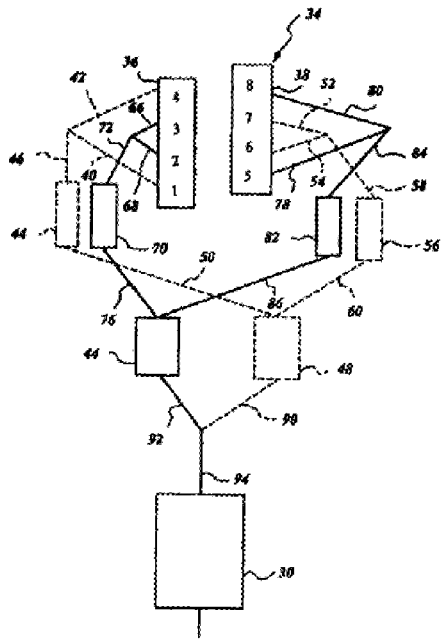

UNITED STATES PATENT AND TRADEMARK OFFICE
CERTIFICATE OF CORRECTION

PATENT NO. : 6,928,988 B2
APPLICATION NO. : 10/152324
DATED : August 16, 2005
INVENTOR(S) : Masato Nishigaki It is certified that error appears in the above-identified patent and that said Letters Patent is hereby corrected as shown below:

In the Drawings delete fig. 1 and insert the following:

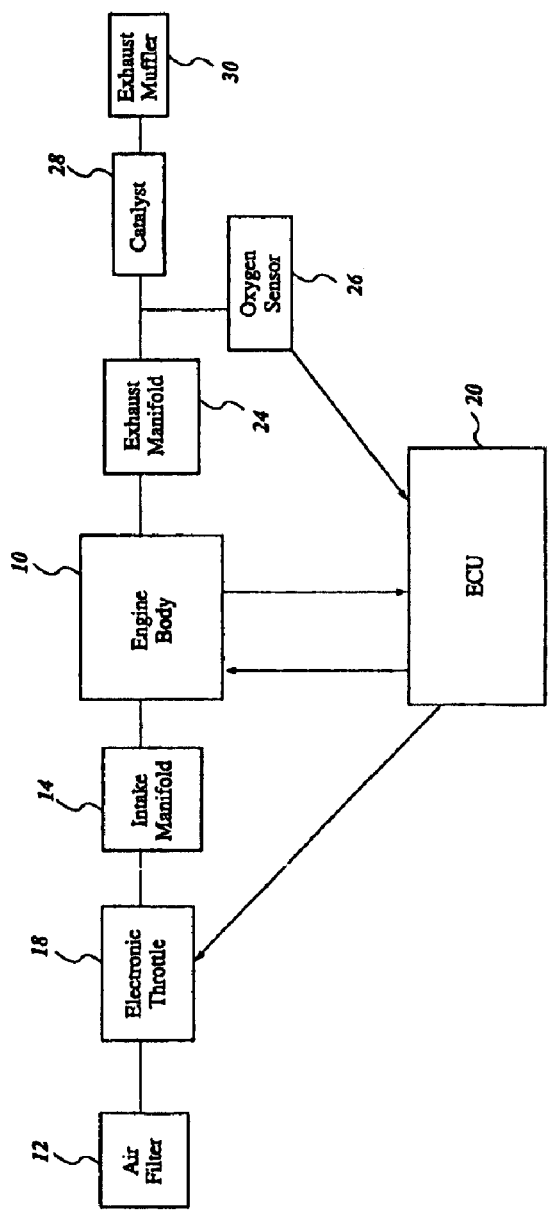

*Figure 1*

UNITED STATES PATENT AND TRADEMARK OFFICE
CERTIFICATE OF CORRECTION

PATENT NO.         : 6,928,988 B2
APPLICATION NO. : 10/152324
DATED                  : August 16, 2005
INVENTOR(S)        : Masato Nishigaki It is certified that error appears in the above-identified patent and that said Letters Patent is hereby corrected as shown below:

In the Drawings delete fig. 2 and insert the following:

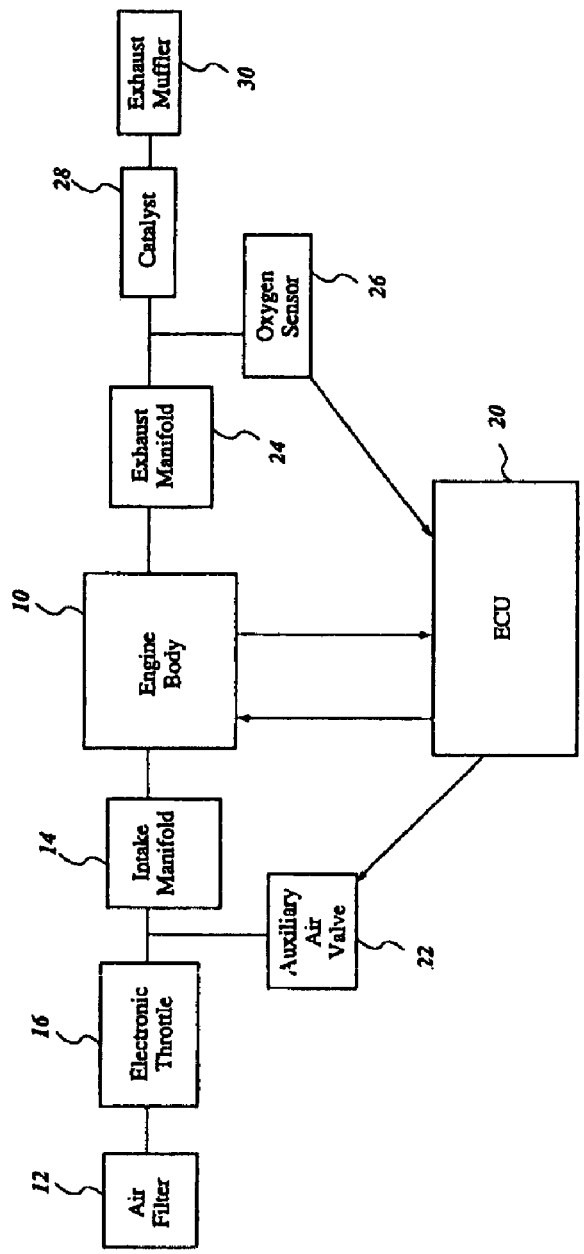

*Figure 2*

UNITED STATES PATENT AND TRADEMARK OFFICE
CERTIFICATE OF CORRECTION

| | | |
|---|---|---|
| PATENT NO. | : 6,928,988 B2 | Page 5 of 8 |
| APPLICATION NO. | : 10/152324 | |
| DATED | : August 16, 2005 | |
| INVENTOR(S) | : Masato Nishigaki | |

It is certified that error appears in the above-identified patent and that said Letters Patent is hereby corrected as shown below:

In the Drawings delete fig. 3 and insert the following:

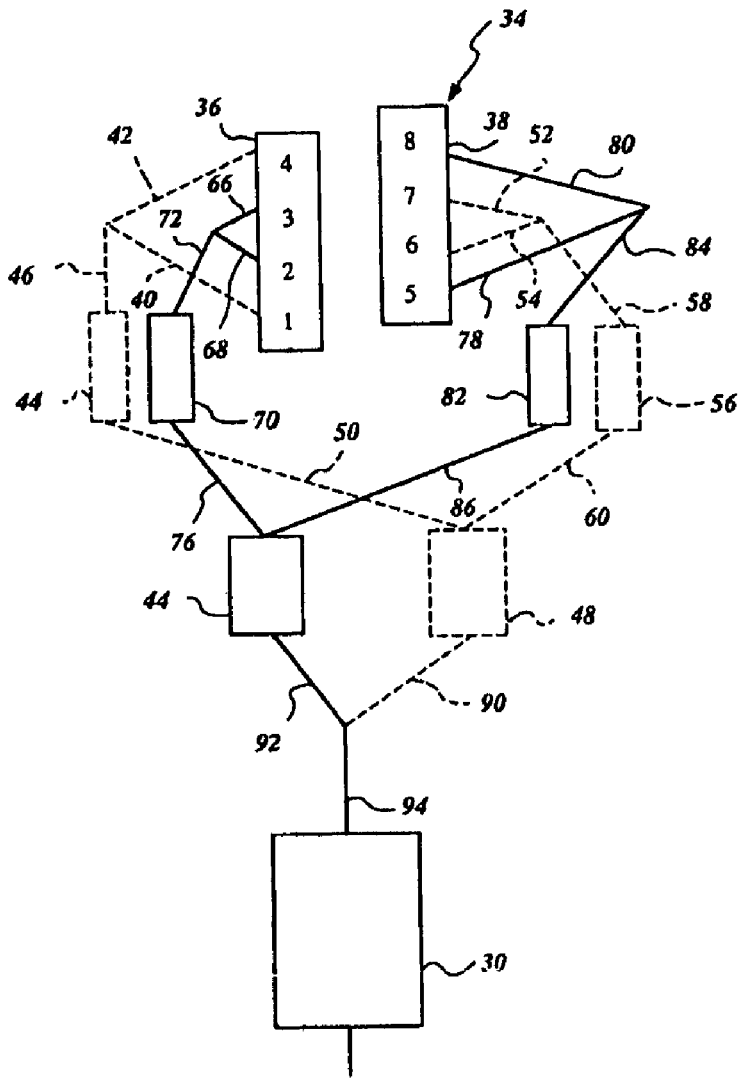

*Figure 3*

UNITED STATES PATENT AND TRADEMARK OFFICE
CERTIFICATE OF CORRECTION

| | | |
|---|---|---|
| PATENT NO. | : 6,928,988 B2 | |
| APPLICATION NO. | : 10/152324 | |
| DATED | : August 16, 2005 | |
| INVENTOR(S) | : Masato Nishigaki | |

It is certified that error appears in the above-identified patent and that said Letters Patent is hereby corrected as shown below:

In the Drawings delete fig. 4 and insert the following:

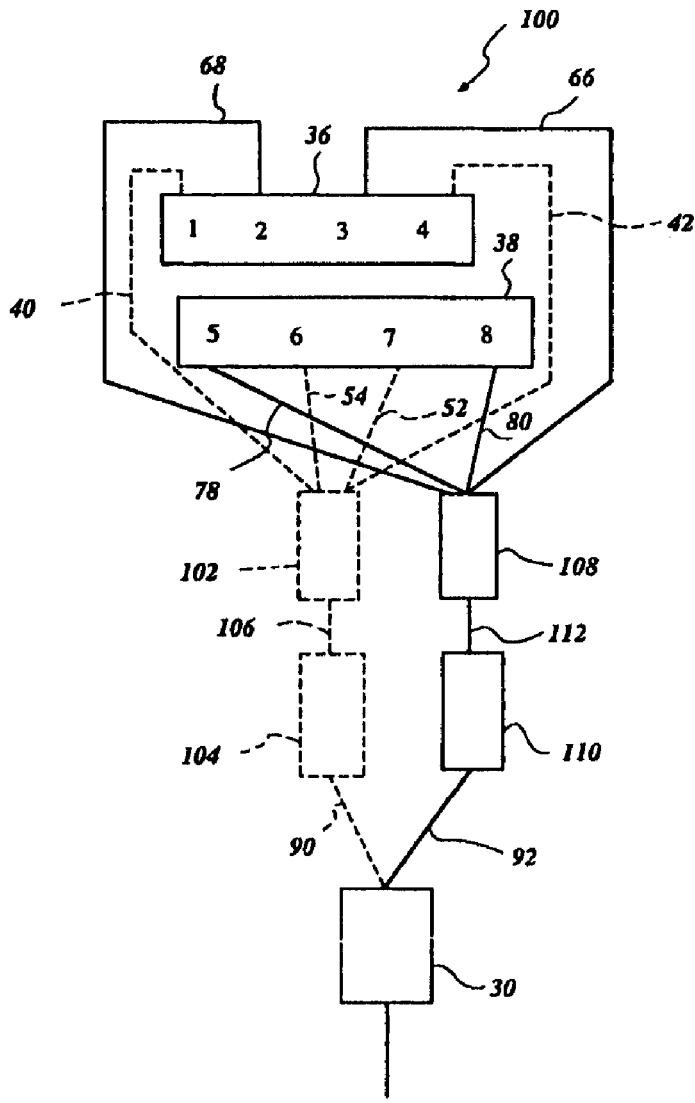

*Figure 4*

UNITED STATES PATENT AND TRADEMARK OFFICE
CERTIFICATE OF CORRECTION

| | | |
|---|---|---|
| PATENT NO. | : 6,928,988 B2 | Page 7 of 8 |
| APPLICATION NO. | : 10/152324 | |
| DATED | : August 16, 2005 | |
| INVENTOR(S) | : Masato Nishigaki | |

It is certified that error appears in the above-identified patent and that said Letters Patent is hereby corrected as shown below:

In the Drawings delete fig. 5 and insert the following:

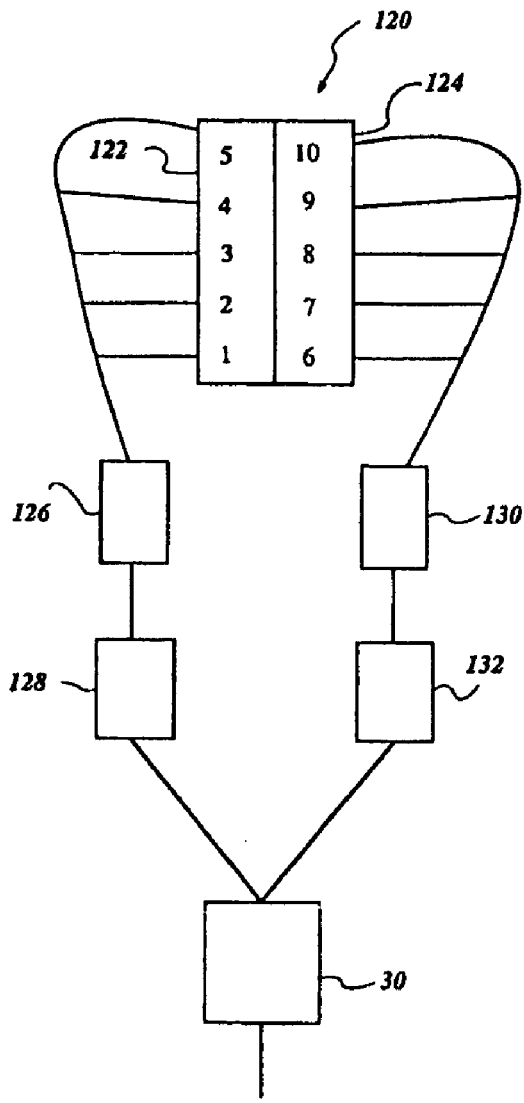

*Figure 5*

UNITED STATES PATENT AND TRADEMARK OFFICE
CERTIFICATE OF CORRECTION

PATENT NO.       : 6,928,988 B2
APPLICATION NO.  : 10/152324
DATED            : August 16, 2005
INVENTOR(S)      : Masato Nishigaki It is certified that error appears in the above-identified patent and that said Letters Patent is hereby corrected as shown below:

In the Drawings delete fig. 6 and insert the following:

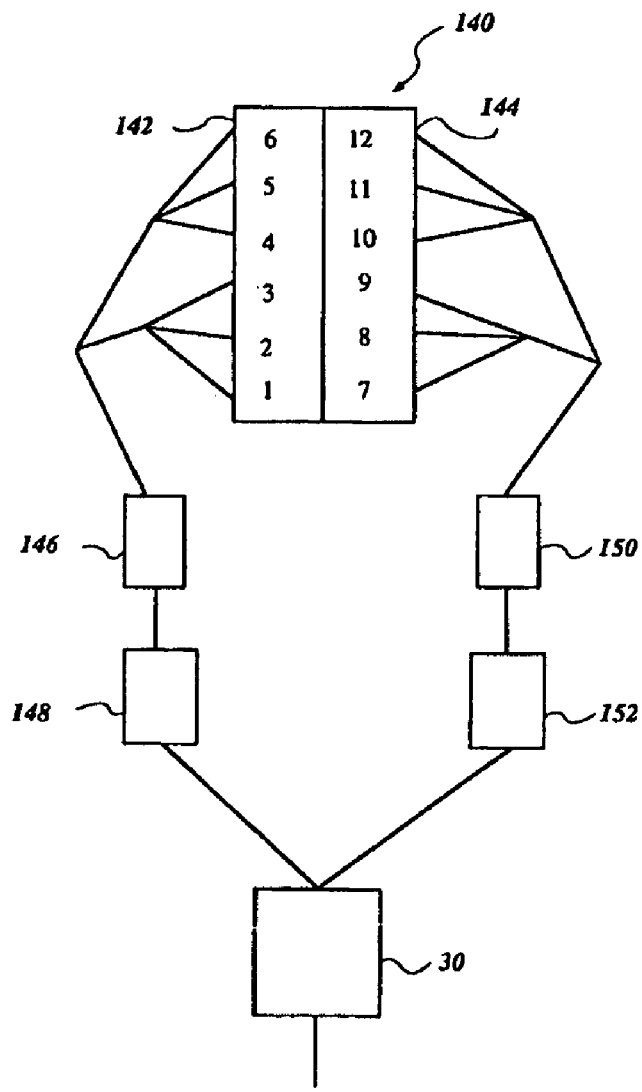

Figure 6